(12) United States Patent
Rofougaran (10) Patent No.: US 7,668,528 B2
(45) Date of Patent: Feb. 23, 2010

(54) ALTERNATIVELY POWERED LOW POWER IC

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 291 days.

(21) Appl. No.: 11/527,956

(22) Filed: Sep. 27, 2006

(65) Prior Publication Data
US 2007/0229262 A1 Oct. 4, 2007

Related U.S. Application Data

(63) Continuation-in-part of application No. 11/394,808, filed on Mar. 31, 2006.

(51) Int. Cl.
*G05F 1/10* (2006.01)
*G05F 3/02* (2006.01)

(52) U.S. Cl. .............. 455/343.3; 340/572.5; 340/10.4; 455/41.1; 455/41.2; 327/536; 363/61

(58) Field of Classification Search .............. 340/10.1, 340/10.33, 10.34, 572.1, 572.5, 572.7, 10.4–10.42, 340/572.4; 342/42, 44, 51; 235/492; 455/41.1, 455/41.2, 343.2, 343.3; 327/530–540; 363/60–61
See application file for complete search history.

(56) References Cited

U.S. PATENT DOCUMENTS

| | | | | |
|---|---|---|---|---|
| 4,829,166 A | * | 5/1989 | Froelich | ..................... 235/379 |
| 5,453,748 A | * | 9/1995 | Lindell | ........................ 342/51 |
| 5,666,355 A | * | 9/1997 | Huah et al. | ................. 370/311 |
| 5,818,382 A | * | 10/1998 | Gutwerk | ...................... 342/46 |
| 6,427,065 B1 | * | 7/2002 | Suga et al. | ................. 455/41.1 |
| 6,463,039 B1 | * | 10/2002 | Ricci et al. | .................. 370/277 |
| 6,496,055 B2 | * | 12/2002 | Li | .............................. 327/536 |
| 6,549,064 B2 | * | 4/2003 | Bandy et al. | ................. 327/536 |
| 7,154,396 B2 | * | 12/2006 | Reunamaki | .............. 340/572.4 |
| 7,255,283 B2 | * | 8/2007 | Akaida et al. | ............... 235/492 |
| 7,334,735 B1 | * | 2/2008 | Antebi et al. | ............... 235/492 |
| 7,561,866 B2 | * | 7/2009 | Oliver et al. | ............. 455/343.3 |

* cited by examiner

*Primary Examiner*—Davetta W Goins
*Assistant Examiner*—Anne V Lai
(74) *Attorney, Agent, or Firm*—Garlick Harrison & Markison; Timothy W. Markison (57) ABSTRACT

A low power integrated circuit (IC) includes a power supply module, first circuitry, and second circuitry. The power supply module is coupled to receive a power source signal from a source external to the low power IC, derive an electromagnetic signal from the power source signal, and convert the electromagnetic signal into a supply voltage. The first circuitry is coupled to produce a first resultant from a first stimulus, wherein the first circuitry is powered via the supply voltage. The second circuitry is coupled to produce a second resultant from a second stimulus, wherein the second circuitry via powered by the supply voltage.

23 Claims, 7 Drawing Sheets

ALTERNATIVELY POWERED LOW POWER IC

This patent application is claiming priority under 35 USC § 120 as a continuation-in-part patent application of co-pending patent application entitled Power Generating Circuit, having a filing date of Mar. 31, 2006, and a Ser. No. 11/394,808.

CROSS REFERENCE TO RELATED PATENTS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Technical Field of the Invention

This invention relates generally to integrated circuits and more particularly to alternative powering of integrated circuits.

2. Description of Related Art

As is known, integrated circuits (ICs) are used in a multitude of electronic devices, including radios, wireless local area network (WLAN) devices, cellular telephones, cable set top boxes and/or modems, Bluetooth devices, radio frequency identification (RFID) readers, computers, personal digital assistants (PDA), etc. Each of these electronic devices includes a battery and/or an AC to DC power supply to provide the power to the ICs contained therein. When the device is powered via a battery, the battery voltage may be used to directly power the ICs or it may be converted to convert the battery voltage into one or more DC voltages that power the ICs.

As is also known, advances in integrated circuit design and manufacturing continues to reduce the power consumption of ICs. While the power consumption of ICs is continuing to be reduced, for battery operated devices, the energy of the battery will eventually be consumed. When this occurs, a new battery is required or the battery needs to be recharged. In either case, it adds cost to use the device and/or is time consuming for the user of the device.

Therefore, a need exists for an alternatively powered low power integrated circuits thereby reducing or eliminating the need to power such low power ICs by a battery.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
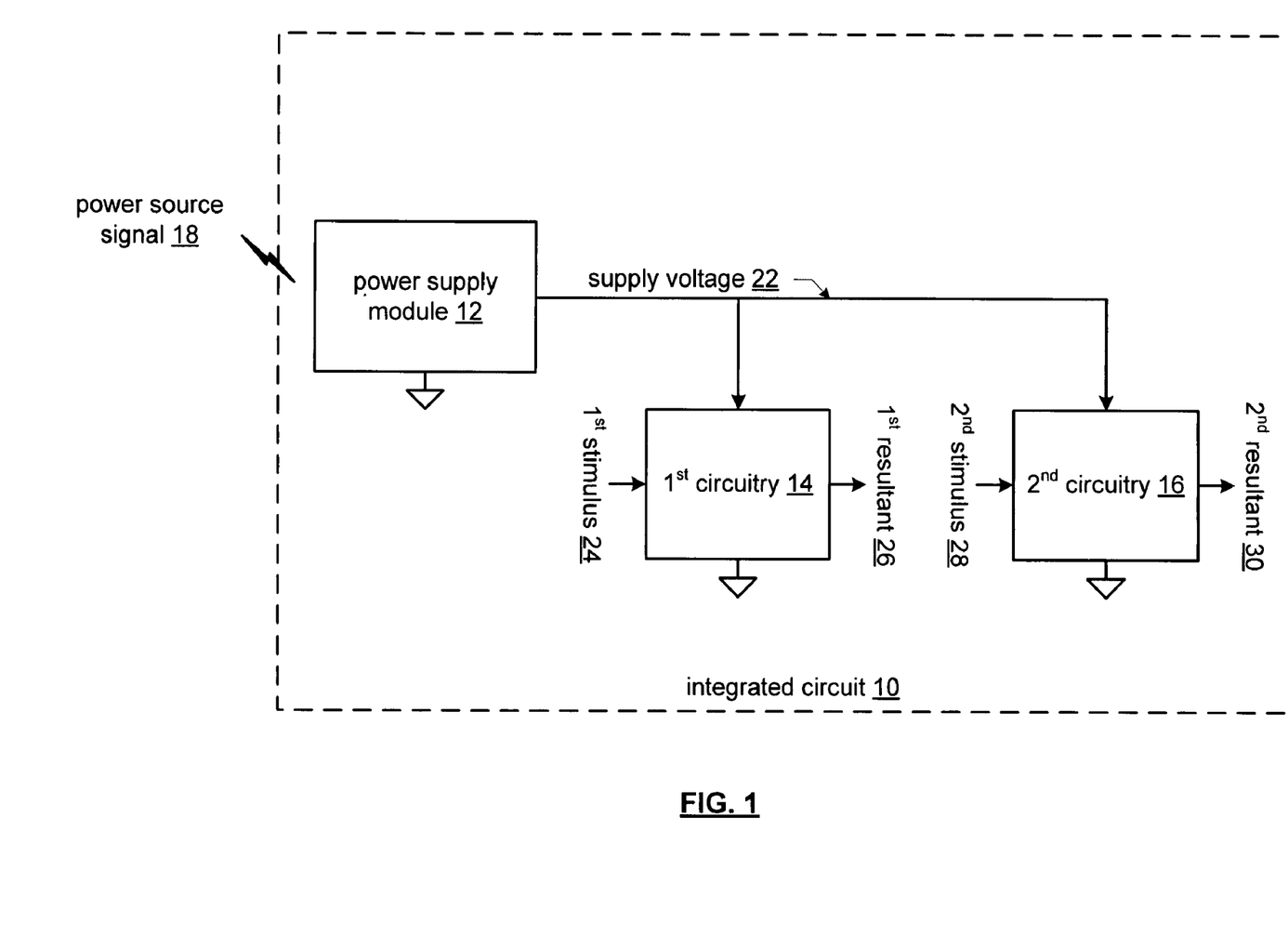
FIG. 1 is a schematic block diagram of an embodiment of an integrated circuit (IC) in accordance with the present invention.

FIG. 1 is a schematic block diagram of an embodiment of an integrated circuit (IC) 10 that includes a power supply module 12, first circuitry 14, and second circuitry 16. The power supply module 12, which will be described in greater detail with reference to one or more of FIGS. 3, 4, 7, and 8, receives a power source signal 18 from a source external to the low power IC. For example, the power source signal 18 may be an electromagnetic signal, light, a radio frequency signal, and/or heat. In one embodiment, the power supply module 12 derives an electromagnetic signal from the power source signal and converts the electromagnetic signal into a supply voltage 22. In another embodiment, the power supply module 12 converts the power source signal 18 into a supply voltage 22.

The first circuitry 14, which may be an analog circuit, a digital circuit, a processing circuit and/or any type of circuit that may be implemented on an IC, produces a first resultant 26 from a first stimulus 24. The second circuitry 16, which may be an analog circuit, a digital circuit, a processing circuit and/or any type of circuit that may be implemented on an IC, produces a second resultant 30 from a second stimulus 28. As shown, the first and second circuitries 14 and 16 are powered via the supply voltage 22.

Figure 2:
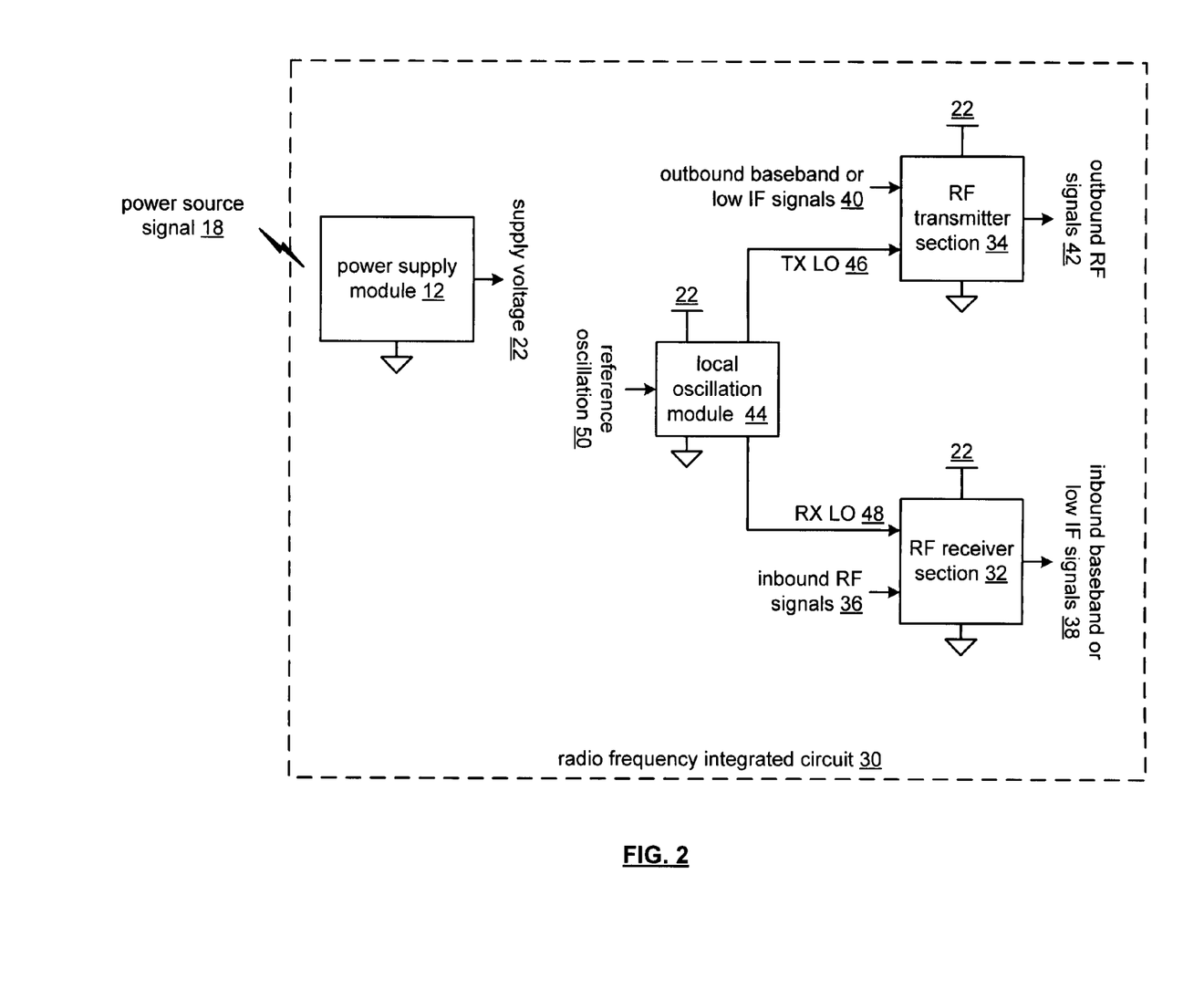
FIG. 2 is a schematic block diagram of an embodiment of a radio frequency integrated circuit in accordance with the present invention.

FIG. 2 is a schematic block diagram of an embodiment of a radio frequency integrated circuit (RFIC) 30 that includes the power supply module 12, a radio frequency (RF) transmitter section 34, an RF receiver section 32, and a local oscillation module 44. The power supply module 12 generates the supply voltage 22 from the power source signal 18, where the supply voltage 22 powers the RF transmitter section 34, the RF receiver section 32, and the local oscillation module 44.

The local oscillation (LO) module 44 produces a receive local oscillation 48 and a transmit local oscillation 46 from a reference oscillation 50. The LO module may include a phase locked loop, a ring oscillator, a clock circuit, frequency dividers, and/or frequency multipliers to produce the transmit and receive local oscillations 46 and 48.

The RF receiver section 32 (which may include a low noise amplifier, RF bandpass filtering, a direct RF to baseband conversion section or a superheterodyne conversion section, and/or an analog to digital converter) converts inbound RF signals 36 into inbound baseband or low intermediate frequency (IF) signals 38 based on the receive local oscillation 48. Note that the inbound baseband or low IF signals 38 may be digital baseband signals (e.g., have a zero IF) or digital low IF signals, where the low IF typically will be in a frequency range of one hundred kilohertz to a few megahertz.

The RF transmitter section 34 (which may include a digital to analog converter, a direct baseband to RF conversion section or a superheterodyne conversion section, a power amplifier, and/or RF bandpass filtering), converts output baseband or low IF signals 40 into outbound RF signals 42 based on the transmit local oscillation 46. Note that the outbound baseband or low IF signals 40 may be digital baseband signals (e.g., have a zero IF) or digital low IF signals, where the low IF typically will be in a frequency range of one hundred kilohertz to a few megahertz.

Figure 3:
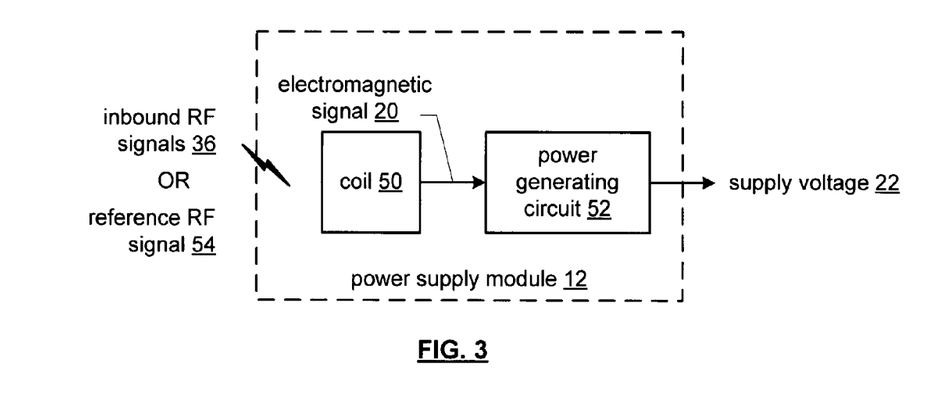
FIG. 3 is a schematic block diagram of an embodiment of a power supply module in accordance with the present invention.

FIG. 3 is a schematic block diagram of an embodiment of a power supply module 12 that includes a coil 50 and a power generating circuit 52. The coil 50 may be a single or multiple metallic winding and/or an antenna coil coupled to receive the inbound RF signals 36 and/or a reference RF signal 54. The reference RF signal 54 may be a sinusoidal signal having a frequency corresponding to a carrier frequency of the inbound RF signal 36 or a sinusoidal signal having a frequency different than the carrier frequency of the inbound RF signal 36. The coil 50 converts the inbound RF signals 36 and/or the reference RF signal 54 into an electromagnetic signal. The power generating circuit 52 converts the electromagnetic signal 20 into the supply voltage 22.

Figure 4:
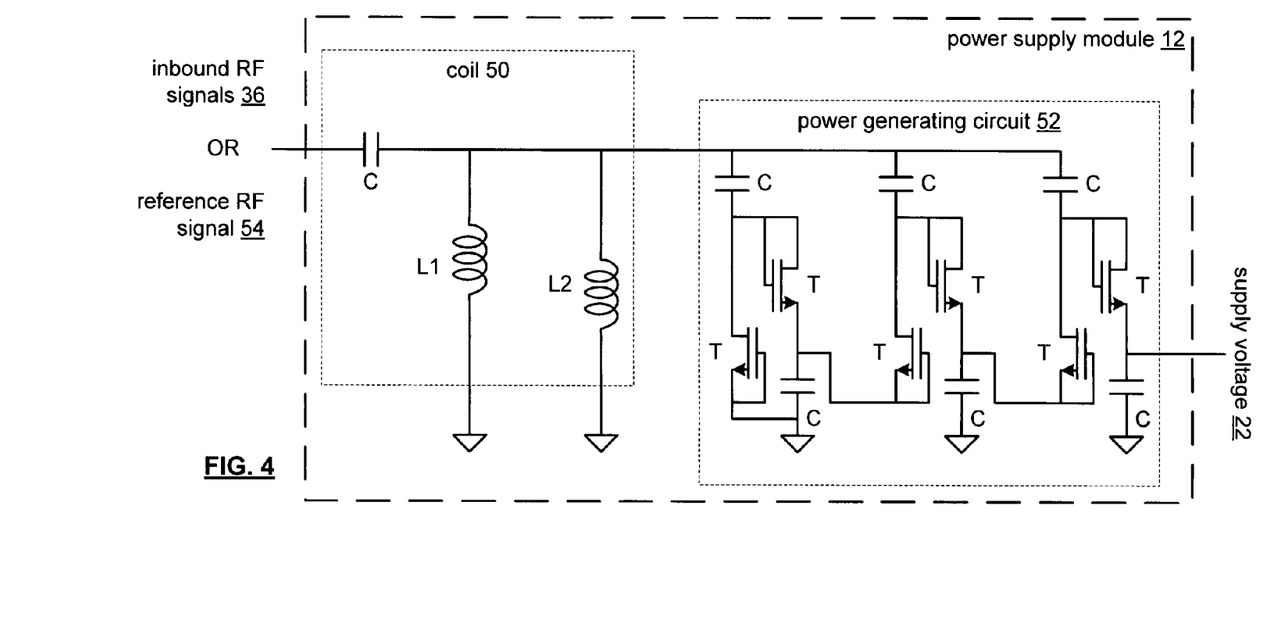
FIG. 4 is a schematic block diagram of an embodiment of a power supply module in accordance with the present invention.

FIG. 4 is a schematic block diagram of an embodiment of a power supply module 12 that includes a coil 50 and a power generating circuit 52. In this embodiment, the coil 50 may include an impedance matching circuit (e.g., C and L1) and a tuning circuit (e.g., L2). The impedance matching circuit has a resonant frequency based on the desired impedance. For instance, the power generating circuit 52 may be modeled as an effective capacitor in parallel with an effective resistance. With this model and the known frequency of the RF signal (e.g., 900 MHz to 6 GHz), the resonant frequency of the impedance matching circuit and the desired frequency response of the power generating circuit 52 (i.e., the value of the tuning circuit) may be readily determined. Note that an input impedance other than 50 Ohms may be used such that maximum power is obtained from the antenna. Further note that an optimum input impedance as seen from the antenna side may be achieved by taking into account both the reflection loss and voltage amplitude at the rectifier input port.

When the impedance matching circuit includes a capacitor-inductor (e.g., C and L1) filter and the tuning circuit includes a parallel inductor (e.g., L2), a single inductor may be used to provide the inductance for the tuning circuit and the inductance of the impedance matching circuit. For instance, the inductor may be a high quality factor (e.g., 10 or greater) and have an impedance of a few nano-Henries. With this inductor, the capacitance can be chosen to have a self resonance frequency above or below the frequency of the RF signal. Note that the components of impedance matching circuit and tuning circuit may be adjustable. For example, an adjustable capacitor may be achieved by a plurality of capacitors switched using pre-charge transistors. Further note that the inductor may be used as the antenna to receive the RF signal. Use of the inductor as the antenna depends on the size of the inductor and the distance between the RFID reader and the RFID tag.

In this embodiment, the power generating circuit 52 is shown as a charge pump rectifier having a plurality of transistors (T) and a plurality of capacitors (C), where two capacitors and two transistors form a cell. The cells are coupled to sequential increase the voltage on the capacitor of a cell that is coupled to ground. The supply voltage is provided by the ground coupled capacitor of the last cell. As one of ordinary skill in the art will appreciate, the number of cells in the power generating circuit 52 may be more or less than the three shown. As one of ordinary skill in the art will further appreciate, the power generating circuit 52 may employ an active cell rectifier topology. In one embodiment, the transistors T may be native transistors such that the voltage drop to build a supply voltage is reduced.

Figure 5:
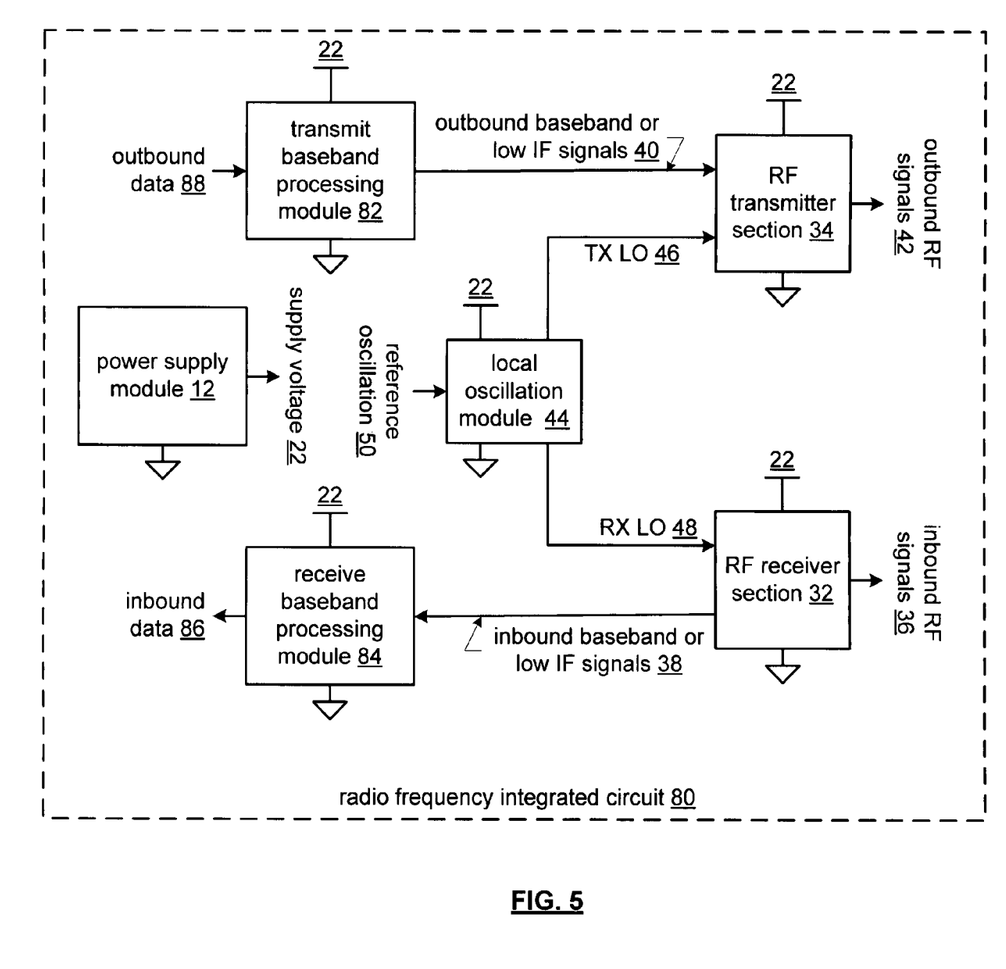
FIG. 5 is a schematic block diagram of another embodiment of a radio frequency integrated circuit in accordance with the present invention.

FIG. 5 is a schematic block diagram of another embodiment of a radio frequency integrated circuit (RFIC) 30 that includes the power supply module 12, a radio frequency (RF) transmitter section 34, an RF receiver section 32, a local oscillation module 44, a transmit baseband processing module 82, and a receive baseband processing module 84. The power supply module 12 generates the supply voltage 22 from the power source signal 18, where the supply voltage 22 powers the RF transmitter section 34, the RF receiver section 32, the local oscillation module 44, the transmit baseband processing module 82, and the receive baseband processing module 84.

The RF transmitter section 34, the RF receiver section 32, and the local oscillation module 44 operate as previously discussed with reference to FIG. 2. In this embodiment, the transmit baseband processing module 82 converts outbound data 88 into the outbound baseband or low IF signal 40. To achieve the conversion of the outbound data 88 into the transmit baseband or low IF signals 40, the transmit baseband processing module 82 may perform one or more transmitter functions upon the outbound data 88. The transmitter functions include, but are not limited to, scrambling, encoding, puncturing, mapping, modulation, and/or digital baseband to IF conversion.

The RF receive section 32 converts the inbound baseband or low IF signals 38 into inbound data 86. To achieve the conversion from the inbound baseband or low IF signals 38 into inbound data 86, the RF receive section 32 performs one or more receiver functions upon the inbound baseband or low IF signals 38 into inbound data 86. The receiver functions include, but are not limited to, digital intermediate frequency to baseband conversion, demodulation, demapping, depuncturing, decoding, and/or descrambling.

Figure 6:
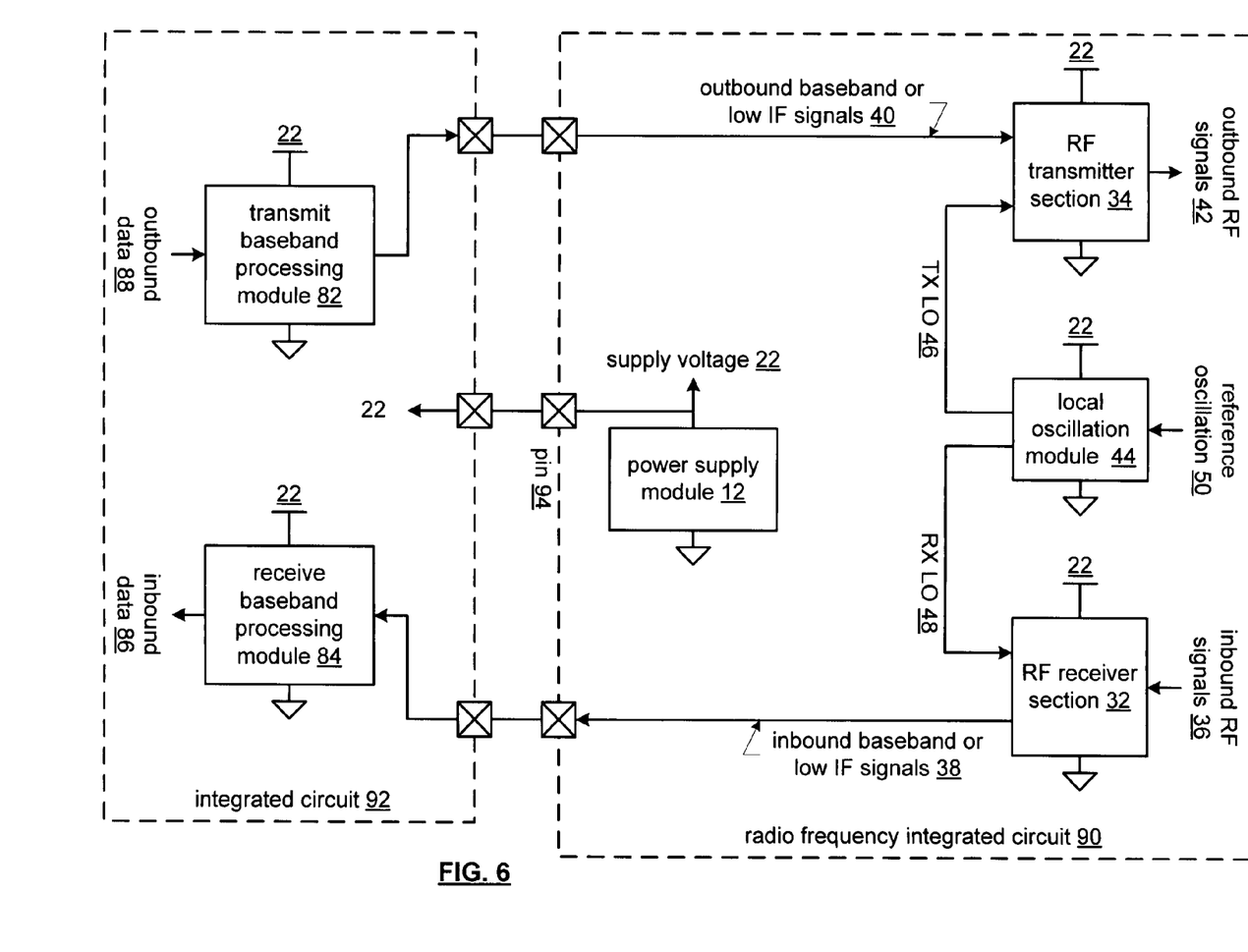
FIG. 6 is a schematic block diagram of another embodiment of a radio frequency integrated circuit coupled to an integrated circuit in accordance with the present invention.

FIG. 6 is a schematic block diagram of another embodiment of a radio frequency integrated circuit (RFIC) 90 coupled to an integrated circuit 92. The RFIC 90 includes the power supply module 12, a radio frequency (RF) transmitter section 34, an RF receiver section 32, and a local oscillation module 44. The power supply module 12 generates the supply voltage 22 from the power source signal 18, where the supply voltage 22 powers the RF transmitter section 34, the RF receiver section 32, and the local oscillation module 44. In addition, the RFIC 90 includes one or more IC pins 94 to provide the supply voltage 22 to the integrated circuit 92. Further, the RFIC 90 include IC pins to provide the inbound baseband or low IF signals 38 to the IC 92 and to receive the outbound baseband or low IF signals 40 from the IC. The IC includes the transmit baseband processing module 82 and the receive baseband processing module 84.

Figure 7:
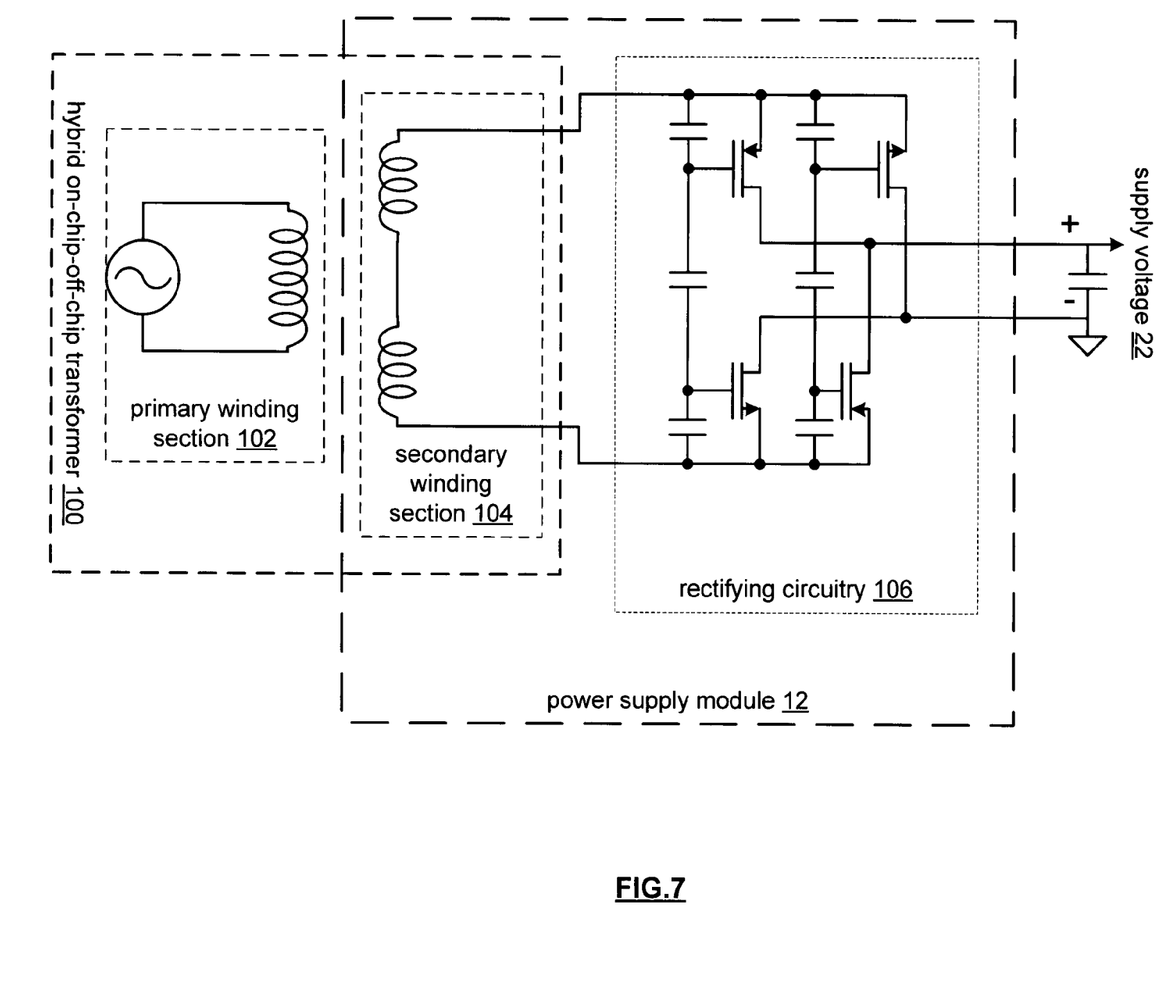
FIG. 7 is a schematic block diagram of another embodiment of a power supply module in accordance with the present invention.

FIG. 7 is a schematic block diagram of another embodiment of a power supply module 12 that includes a secondary winding section 104 and a rectifying circuitry 106. The secondary winding section 104 is part of a hybrid on-chip-off-chip transformer 100 that also includes a primary winding section 102. The primary winding section 102 generates the power source signal 18 from a signal source and provides it to the second winding section 104. For a more detailed discussion of the hybrid on-chip-off-chip transformer 100 refer to co-pending patent application entitled HYBRID ON-CHIP-OFF-CHIP TRANSFORMER, a filing date the same as the present patent application, and a serial number of TBD.

The secondary winding section 104 converts the electromagnetic energy coupled thereto from the primary winding section 102 to produce a sinusoidal signal as the electromagnetic signal 20. The rectifying circuit 106, which is shown as a full bridge rectifying topology but could be a half bridge or other type of rectifying circuit, converts the secondary voltage into the supply voltage 22. As an alternative to the capacitive dividers to provide the biasing of the transistors of the rectifying circuitry 106, the transistors may be biased using a reference voltage.

Figure 8:
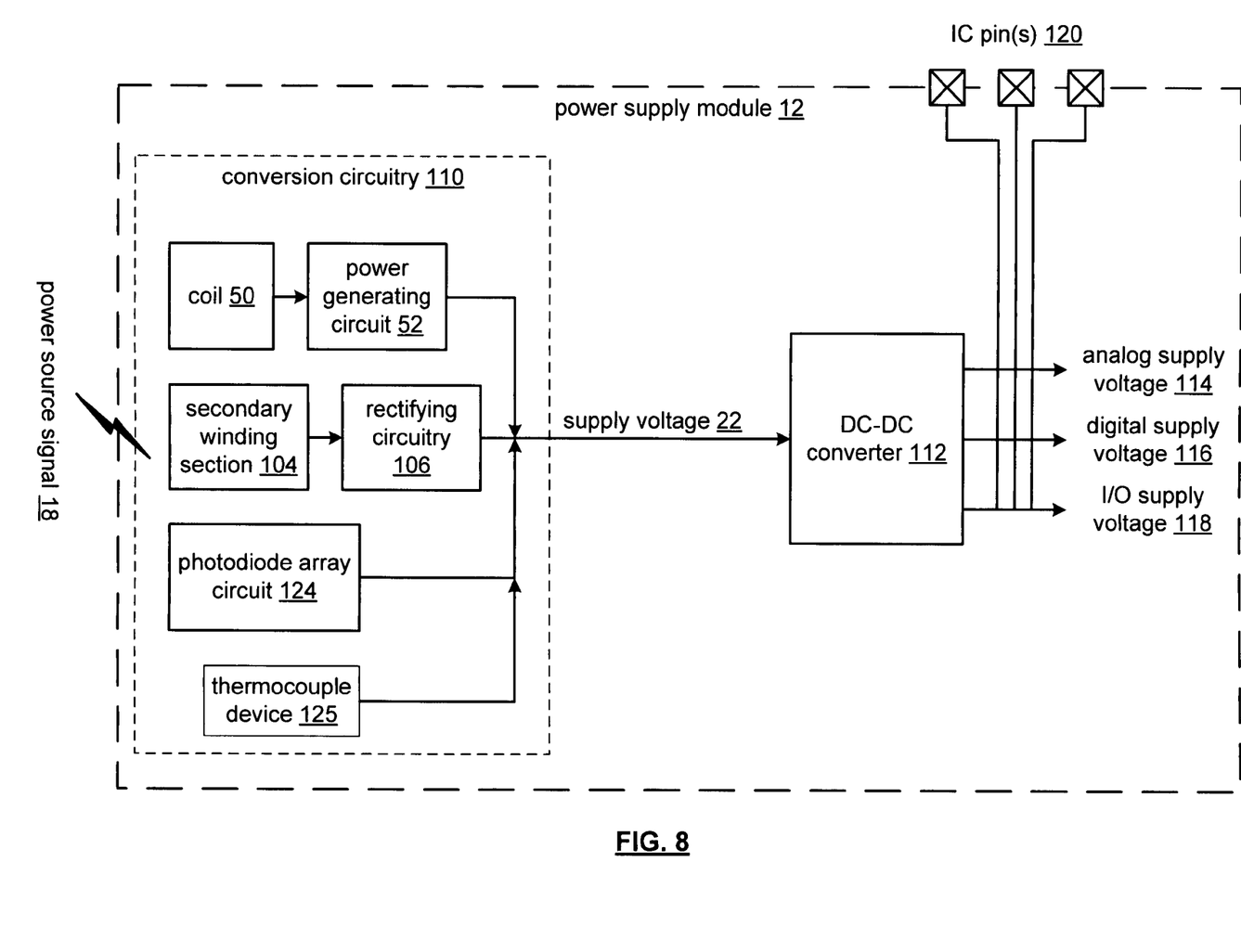
FIG. 8 is a schematic block diagram of another embodiment of a power supply module in accordance with the present invention.

FIG. 8 is a schematic block diagram of another embodiment of a power supply module 12 that includes conversion circuitry 110 and may further include a DC-DC converter 112. The conversion circuitry 110 includes one or more of the coil and power generating circuit 52, the secondary winding 104 and rectifying circuitry 106, a photodiode array circuit 124, and a thermocouple device 125. The photodiode array circuit 124 is operable to convert received light into a voltage. The thermocouple device 125 is operable to convert heat into a voltage.

The one or more power supply sources of the conversion circuitry 110 produce the supply voltage 22, which may be converted into one or more of an analog supply voltage 114, a digital supply voltage 116 and an input/output supply voltage 118 by the DC-DC converter 112. As shown, the one or more supply voltages 114-118 may be provided off chip via IC pins 120.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output (s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A low power integrated circuit (IC) comprises:
a power supply module includes:
a coil coupled to:
receive a power source signal from a source external to the low power IC;
derive an electromagnetic signal from the power source signal;
a power generating circuit coupled to convert the electromagnetic signal into a direct current (DC) supply voltage, wherein the power generating circuit includes a plurality of cells, wherein a first one of the cells converts the electromagnetic signal into a first DC voltage that is further increased by a remainder of the plurality of cells to produce the DC supply voltage, wherein a cell of the plurality of cells includes:
a first capacitor having a first connection and a second connection, wherein the first connection is coupled to receive the electromagnetic signal;
a first transistor having a control node, a source node, and a return node, wherein the control node and the source node of the first transistor are coupled to the second connection of the first capacitor;
a second transistor having a control node, a source node, and a return node, wherein the source node of the second transistor is coupled to the second connection of the first capacitor; and
a second capacitor having a first connection and a second connection, wherein the second connection of the second capacitor is coupled to the control node and the return node of the second transistor and the first connection of the second capacitor is coupled to the return node of the first transistor to produce a DC output of the cell;
first circuitry coupled to produce a first resultant from a first stimulus, wherein the first circuitry is powered via the DC supply voltage; and
second circuitry coupled to produce a second resultant from a second stimulus, wherein the second circuitry is powered by the DC supply voltage.

2. The low power IC of claim 1 comprises:
the first circuitry including a radio frequency (RE) receiver section coupled to convert inbound RF signals into inbound baseband or low intermediate frequency (IF) signals based on a receive local oscillation; and
the second circuitry including an RE transmitter section coupled to convert output baseband or low IF signals into outbound RE signals based on a transmit local oscillation.

3. The low power IC of claim 2 comprises:
a local oscillation module coupled to produce the receive local oscillation and the transmit local oscillation from a reference oscillation, wherein the local oscillation module is powered via the supply voltage.

4. The low power IC of claim 2 comprises:
a receive baseband processing module coupled to convert the inbound baseband or low IF signals into inbound data, wherein the receive baseband processing module is powered via the DC supply voltage; and
a transmit baseband processing module coupled to convert outbound data into the outbound baseband or low IF signals, wherein the transmit baseband processing module is powered via the DC supply voltage.

5. The low power IC of claim 2 comprises:
a power supply pin coupled to a baseband processing IC, wherein the power supply module provides an off-chip supply voltage to the baseband processing IC via the power supply pin, wherein the off-chip supply voltage is derived from the DC supply voltage, and wherein the baseband processing IC converts the inbound baseband or low IF signals into inbound data and converts outbound data into the outbound baseband or low IF signals.

6. The low power IC of claim 1, wherein the power supply module comprises:
the coil is a secondary winding section of a hybrid on-chip-off-chip transformer, wherein the secondary winding section derives the electromagnetic signal from a primary electromagnetic signal provided by a primary winding section of the hybrid on-chip-off-chip transformer.

7. The low power IC of claim 1, wherein the power supply module further comprises:
a DC-DC converter coupled to convert the DC supply voltage into at least one of: an analog supply voltage, a digital supply voltage, and an input/output supply voltage.

8. The low power IC of claim 1, wherein the power supply module further comprises:
the power generating circuit coupled to convert the electromagnetic signal into a first voltage; and
a photodiode array module coupled to convert received light into a second voltage, wherein the DC supply voltage is derived from the first and second voltages.

9. A low power integrated circuit (IC) comprises:
a power supply module includes:
a plurality of power conversion circuits to produce a plurality of voltages from a plurality of power source signals, wherein the plurality of voltages are combine to produce a direct current (DC) supply voltage, wherein one of the plurality of power conversion circuits includes:
a coil coupled to:
receive a power source signal from a source external to the low power IC;
derive an electromagnetic signal from the power source signal;
a power generating circuit coupled to convert the electromagnetic signal into a DC voltage of the plurality of voltages, wherein the power generating circuit includes a plurality of cells, wherein a first one of the cells converts the electromagnetic signal into a first DC voltage that is further increased by a remainder of the plurality of cells into the DC voltage, wherein a cell of the plurality of cells includes:
a first capacitor having a first connection and a second connection, wherein the first connection is coupled to receive the electromagnetic signal;
a first transistor having a control node, a source node, and a return node, wherein the control node and the source node of the first transistor are coupled to the second connection of the first capacitor;
a second transistor having a control node, a source node, and a return node, wherein the source node of the second transistor is coupled to the second connection of the first capacitor; and
a second capacitor having a first connection and a second connection, wherein the second connection of the second capacitor is coupled to the control node and the return node of the second transistor and the first connection of the second capacitor is coupled to the return node of the first transistor to produce a DC output of the cell;
first circuitry coupled to produce a first resultant from a first stimulus, wherein the first circuitry is powered via the DC supply voltage; and
second circuitry coupled to produce a second resultant from a second stimulus, wherein the second circuitry is powered by the DC supply voltage.

10. The low power IC of claim 9, wherein a second one of the plurality of power conversion circuits comprises:
a secondary winding section of a hybrid on-chip-off-chip transformer, wherein the secondary winding section derives an electromagnetic signal from a primary electromagnetic signal provided by a primary winding section of the hybrid on-chip-off-chip transformer; and
rectifying circuitry coupled to produce one of the plurality of voltages from the electromagnetic signal.

11. The low power IC of claim 9, wherein the power supply module comprises:
a DC-DC converter coupled to convert the DC supply voltage into at least one of: an analog supply voltage, a digital supply voltage, and an input/output supply voltage.

12. The low power IC of claim 11 comprises:
at least one power supply pin to provide at least one of the DC supply voltage, the analog supply voltage, the digital supply voltage, and the input/output supply voltage off chip.

13. The low power IC of claim 9, wherein a second one of the plurality of power conversion circuits comprises:
a photodiode array module coupled to convert the light into one of the plurality of voltages.

14. The low power IC of claim 9, wherein a second one of the plurality of power conversion circuits comprises:
- a thermocouple device coupled to convert heat into the supply voltage.

15. A low power radio frequency integrated circuit (IC) comprises:
- a power supply module includes:
- a plurality of power conversion circuits to produce a plurality of voltages from a plurality of power source signals, wherein the plurality of voltages are combine to produce a direct current (DC) supply voltage, wherein one of the plurality of power conversion circuits includes:
  - a coil coupled to:
    - receive a power source signal from a source external to the low power IC;
    - derive an electromagnetic signal from the power source signal;
  - a power generating circuit coupled to convert the electromagnetic signal into a DC voltage of the plurality of voltages, wherein the power generating circuit includes a plurality of cells, wherein a first one of the cells converts the electromagnetic signal into a first DC voltage that is further increased by a remainder of the plurality of cells into the DC voltage, wherein a cell of the plurality of cells includes:
    - a first capacitor having a first connection and a second connection, wherein the first connection is coupled to receive the electromagnetic signal;
    - a first transistor having a control node, a source node, and a return node, wherein the control node and the source node of the first transistor are coupled to the second connection of the first capacitor;
    - a second transistor having a control node, a source node, and a return node, wherein the source node of the second transistor is coupled to the second connection of the first capacitor; and
    - a second capacitor having a first connection and a second connection, wherein the second connection of the second capacitor is coupled to the control node and the return node of the second transistor and the first connection of the second capacitor is coupled to the return node of the first transistor to produce a DC output of the cell;
- a radio frequency (RE) receiver section coupled to convert inbound RE signals into inbound baseband or low intermediate frequency (IF) signals based on a receive local oscillation, wherein the RF receiver section is powered via the DC supply voltage; and
- an RF transmitter section coupled to convert output baseband or low IF signals into outbound RF signals based on a transmit local oscillation, wherein the RF transmitter section is powered via the DC supply voltage.

16. The low power RFIC of claim 15 comprises:
- a local oscillation module coupled to produce the receive local oscillation and the transmit local oscillation from a reference oscillation, wherein the local oscillation module is powered via the DC supply voltage.

17. The low power RFIC of claim 15 comprises:
- a receive baseband processing module coupled to convert the inbound baseband or low IF signals into inbound data, wherein the receive baseband processing module is powered via the DC supply voltage; and
- a transmit baseband processing module coupled to convert outbound data into the outbound baseband or low IF signals, wherein the transmit baseband processing module is powered via the DC supply voltage.

18. The low power RFIC of claim 15 comprises:
- a power supply pin coupled to a baseband processing IC, wherein the power supply module provides an off-chip supply voltage to the baseband processing IC via the power supply pin, wherein the off-chip supply voltage is derived from the DC supply voltage, and wherein the baseband processing IC converts the inbound baseband or low IF signals into inbound data and converts outbound data into the outbound baseband or low IF signals.

19. The low power RFIC of claim 15, wherein a second one of the plurality of power conversion circuits comprises:
- a secondary winding section of a hybrid on-chip-off-chip transformer, wherein the secondary winding section derives an electromagnetic signal from a primary electromagnetic signal provided by a primary winding section of the hybrid on-chip-off-chip transformer; and
- rectifying circuitry coupled to produce one of the plurality of voltages from the electromagnetic signal.

20. The low power RFIC of claim 15, wherein the power supply module comprises:
- a DC-DC converter coupled to convert the DC supply voltage into at least one of: an analog supply voltage, a digital supply voltage, and an input/output supply voltage.

21. The low power RFIC of claim 20 comprises:
- at least one power supply pin to provide at least one of the DC supply voltage, the analog supply voltage, the digital supply voltage, and the input/output supply voltage off chip.

22. The low power RFIC of claim 15, wherein a second one of the plurality of power conversion circuits comprises:
- a photodiode array module coupled to convert the light into one of the plurality of voltages.

23. The low power RFIC of claim 15, wherein a second one of the plurality of power conversion circuits comprises:
- a photodiode array module coupled to convert the light into one of the plurality of voltages.

* * * * *

UNITED STATES PATENT AND TRADEMARK OFFICE
CERTIFICATE OF CORRECTION

PATENT NO. : 7,668,528 B2 Page 1 of 1
APPLICATION NO. : 11/527956
DATED : February 23, 2010
INVENTOR(S) : Ahmadreza Reza Rofougaran It is certified that error appears in the above-identified patent and that said Letters Patent is hereby corrected as shown below:

Column 7, line 13, in Claim 2: replace "RE" with --RF--.
Column 7, line 17, in Claim 2: replace "RE" with --RF--.
Column 7, line 19, in Claim 2: replace "RE" with --RF--.
Column 9, line 45, in Claim 15: replace "RE" with --RF--.
Column 9, line 46, in Claim 15: replace "RE" with --RF--.

Signed and Sealed this

Twenty-second Day of June, 2010

David J. Kappos
*Director of the United States Patent and Trademark Office*